Aug. 19, 1958    P. LUGINBÜHL    2,848,096
STRAIGHTENING-OUT AND ALIGNING OF ARTICLES
Filed Oct. 22, 1954    4 Sheets-Sheet 2

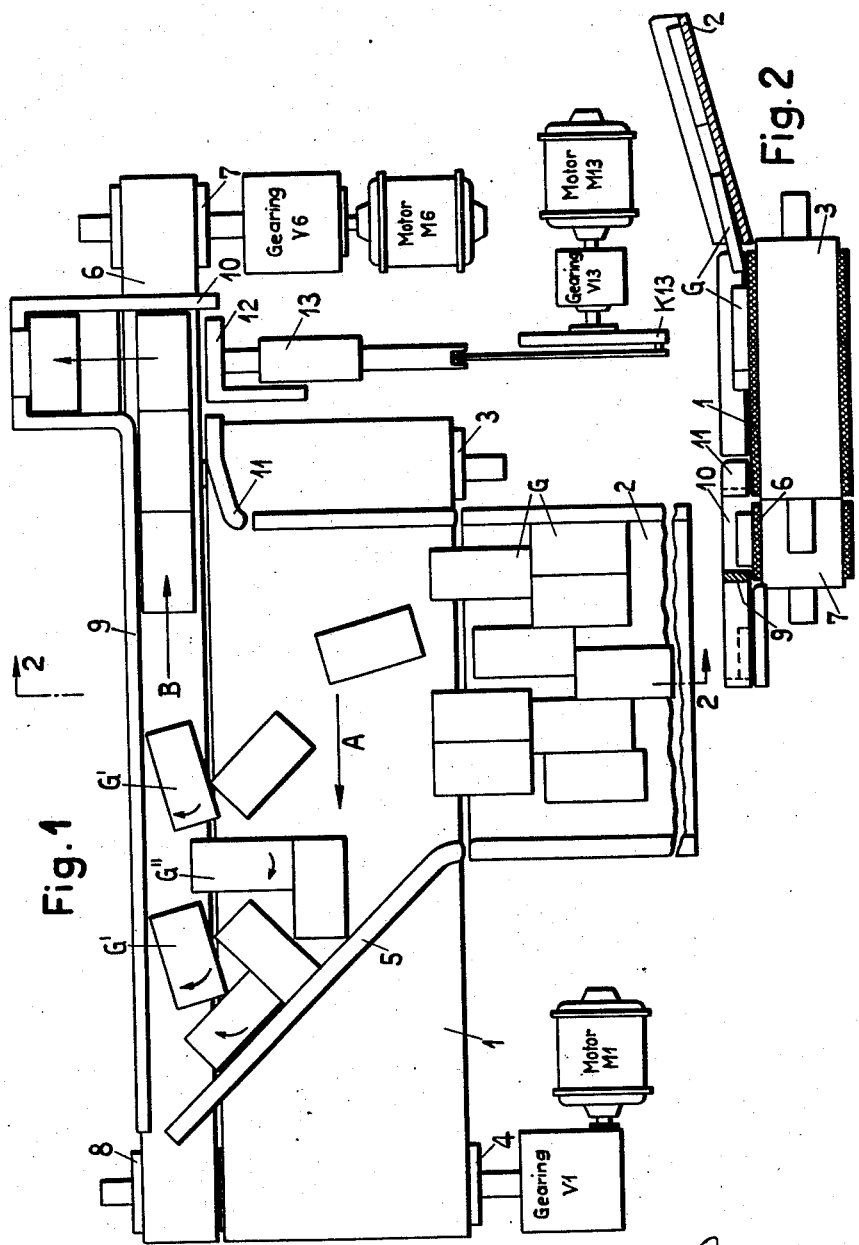

Inventor
Pierre Luginbühl
By
Singer Stern & Carlberg attys.

Aug. 19, 1958 P. LUGINBÜHL 2,848,096
STRAIGHTENING-OUT AND ALIGNING OF ARTICLES
Filed Oct. 22, 1954 4 Sheets-Sheet 3
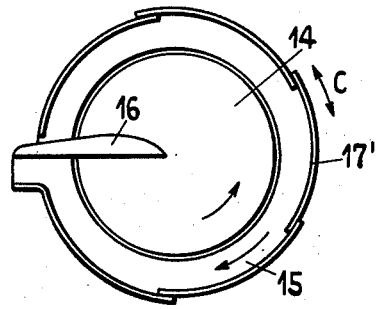
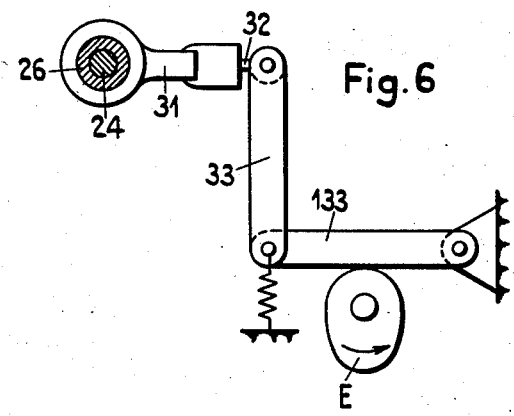
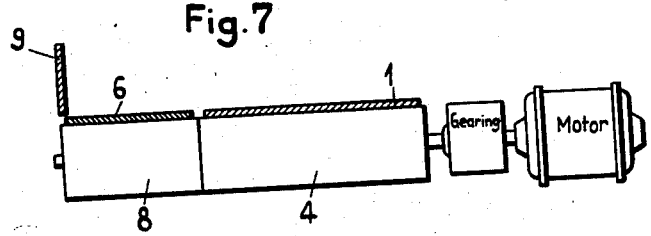

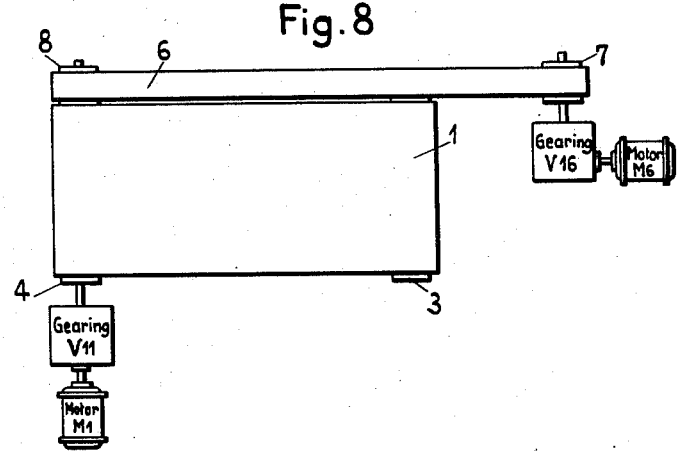
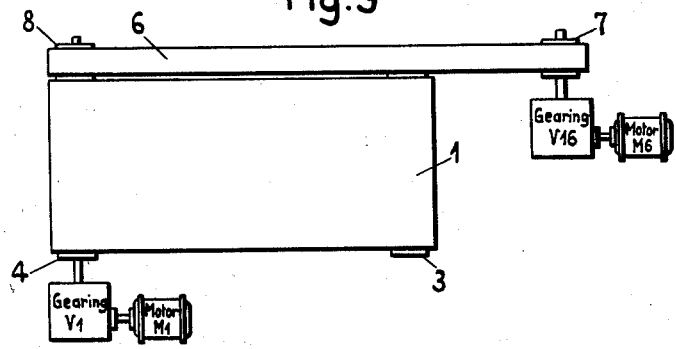
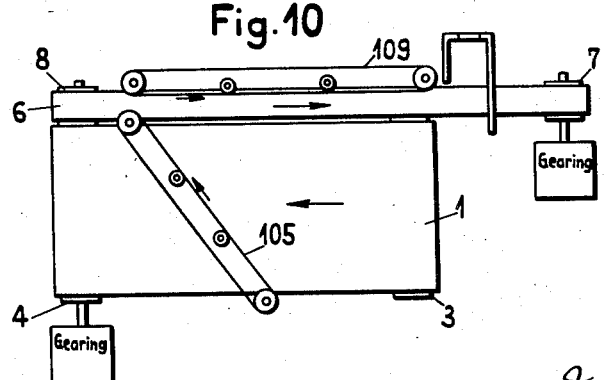

United States Patent Office 2,848,096
Patented Aug. 19, 1958

2,848,096
STRAIGHTENING-OUT AND ALIGNING OF ARTICLES

Pierre Luginbühl, Neuhausen am Rheinfall, Switzerland, assignor to Schweizerische Industrie-Gesellschaft, Neuhausen am Rheinfall, Switzerland Application October 22, 1954, Serial No. 463,986

Claims priority, application Switzerland October 28, 1953

9 Claims. (Cl. 198—30)

The present invention relates to a method and to a device for the straightening-out and aligning of articles supplied at random and without order to the device. Such devices are particularly suitable for the feeding of finishing machines such as automatic packing machines.

The methods hitherto applied as a rule for this purpose, in which the articles to be finished were brought by hand on to a conveyor belt or into the cells of a conveyor plate of a finishing machine, are limited in their applicability by the comparatively low output capacity of the operator. In modern high output machines one has therefore provided, as a make-shift arrangement, for example twin supply channels. Apart from the increased requirement for personnel involved thereby, the increase in the costs of the machine and in the space required makes itself felt unfavorably.

It is the primary object of the present invention to provide a method and a machine suitable for the highest output possible, requiring a single operator only and suitable in apropriate conditions for direct cooperation with the delivery of a production machine, and accordingly for fully automatic operation.

With these and other objects in view I provide a method for the putting into order and the aligning of articles supplied at random, and for the further transport of the articles thus put into order, comprising the following steps in succession: supplying the articles at random to a first transporting means, deflecting the said articles from the said first transporting means on to a second transporting means moving at a different velocity adjacent the said first transporting means, carrying the articles aligning themselves on the said second transporting means away for being discharged, and automatically returning articles not yet put into order to the said first transporting member by applying a turning moment to the said articles owing to the velocity difference between the said two transporting means.

A device according to the invention for the putting into order and the aligning of articles supplied at random and for the further transporting of articles thus put into order, comprises in combination: a first transporting means, a second transporting means running parallel to the said first transporting means over at least a limited range, scraper means extending obliquely across the said first transporting means, and driving means driving the said two transporting means at velocities differing from one another, the said scraper means deflecting the articles carried along by the said first transporting means towards the said second transporting means.

Preferably at least one of the said two transporting means is driven at a periodically varying speed, and more particularly at a so-called pilgrim step motion in which each forward step is followed by a shorter retrograde step, the mean velocities of the two tranporting means being preferably directed in opposite directions.

The said transporting means may for example be endless conveyor belts running side by side, or a rotary disc and flat ring arranged concentrically in the same plane.

These and other objects and features of my said invention will be clearly understood from the following description of some embodiments thereof given by way of example with reference to the accompanying drawings, in which:

Fig. 1 shows a first embodiment of the device in plan view,

Fig. 2 shows a section corresponding to the line 2—2 of Fig. 1,

Figure 4:
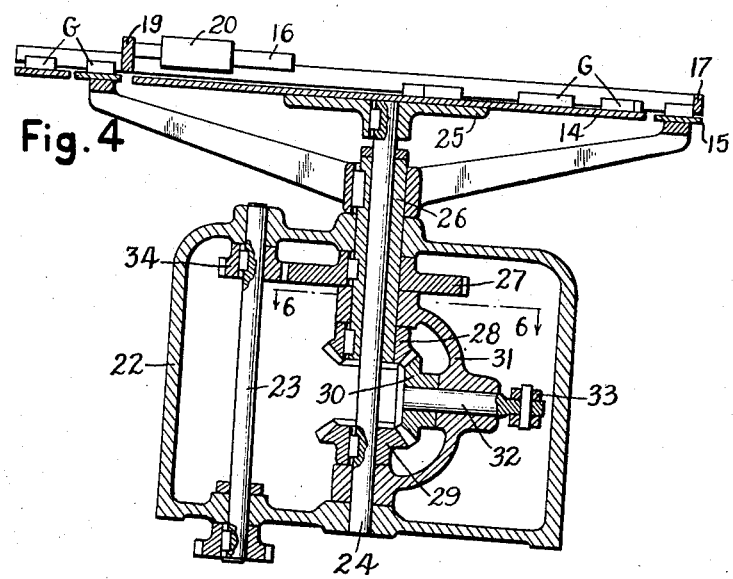
Fig. 4 shows a section corresponding to the line 4—4 in Fig. 3.

Fig. 5 shows a modification of Fig. 4 with an abutment consisting of several pieces, Fig. 6 shows a detail in section along the line 6—6 of Fig. 4, Fig. 7 shows a modification of Fig. 2 with both transporting members arranged at a slant transverse of their direction of movement, Fig. 8 shows a modification of Fig. 1 with a pilgrim-step motion gearing provided for the second transporting member, Fig. 9 shows a modification of Fig. 1 with pilgrim-step motion gearing provided for both transporting members, Fig. 10 shows a modification of Fig. 1 with both the scraper device and the lateral abutment constructed as moving endless members.

The device illustrated in Figs. 1 and 2 comprises a broad endless transporting belt 1 driven by a motor M1 through a speed varying gear V1 and a roller 4 at a non-uniform speed. To this first transporting belt 1 articles G are supplied at random over a sloping chute 2. The belt 1 runs over the guide roller 3, and a scraper 5 is arranged snugly over the belt 1 in such a manner that it includes an acute angle with the direction of movement of the belt. The articles G placed on the belt 1 are engaged the same and transported towards the scraper 5. Owing to its angle relative to the belt 1 the guide plate 5 scrapes the articles G, laterally off the belt 1. Thereby they get into the range of a second endless belt 6, running uniformly parallel to the belt 1. The belt 6 is driven by a motor M6 through a uniform motion gearing V6 and a driving roller 7 and runs over a guide roller 8. The comparatively narrow belt 6 is on its off-side delimited by a fixed abutment 9 in such a manner that its effective width exceeds by a small amount the width of the articles G to be put into order.

The roller 4 is driven through the gearing V1 in such a manner that the belt 1 performs a movement at a periodically varying speed. The change of speed in time is determined in such a manner that the mean resulting velocity of the belt 1 (arrow A) is directed opposite to the constant speed in the direction of the arrow B of the belt 6. This movement of belt 1 is conveniently generated by the superimposition of a reciprocating movement to a uniform movement. The velocity ratio of the two mutually superimposed movements is selected with advantage so that the resulting velocity reaches slightly negative values in the range of its minimum.

When the articles pushed by the scraper 5 laterally across the belt 1 enter into the range of the belt 6 moving in the opposite direction (arrow B) they are firstly still under the influence of the belt 1 and of the scraper 5. To the forces acting on them the frictional forces applied by the belt 6 are then added. Under the simultaneous effect of the forces applied by the three members the articles have the tendency to turn off and to align themselves on the belt 6. This tendency is yet increased as soon as the articles G come into contact with the abutment 9, and accordingly other forces act on it. The articles G put preliminarily into order on the belt 6 move along therewith towards an abutment 10 which is arranged at the end of the run of the belt 6 transversely thereto. The foremost article at any time contacts the abutment 10, and the subsequent articles are pent-up behind it in a closed orderly series.

Owing to the multiplicity of the articles G which travel together through the machine, a mutual influencing thereof occurs so that the process described hereinabove can not take place quite freely. Consequently not all the articles G will continue travelling along on the belt 6 aligned correctly at the first go. While travelling along, the articles not aligned faultlessly are engaged by both the belts 1 and 6, in contradistinction to the finally aligned articles. Owing to the relative movement of the two belts opposite one another the frictional forces then becoming effective apply a torque moment to these articles. These torque moments are so directed, that they have the tendency of turning the articles G', which lie mainly on the narrow belt 6, completely over on to the latter, whereas the articles G" which lie with the greater part of their area on the broad belt 1, are transferred completely on to the same. This whole procedure is favoured by the non-uniform motion of the belt 1, particularly when it is a so-called pilgrim-step motion, in which a forward step is followed by a smaller retrograde step. The varying velocity sets inertia forces into play, which loosen up articles which might have got jammed into one another and in general create conditions which increase the effectiveness of the aforesaid torque moments.

With increasing distance from the scraper 5 there will be met an ever diminishing number of articles on the belt 6 which have not been aligned with one another. Eventually an uninterrupted series of orderly aligned articles enters into the channel formed by the lateral stop 9 and a guide piece 11 having an oblique entry, whereby any small deviations are then corrected. The articles G" returned to the broad belt 1 are passed by the same anew to the scraper 5 whereby they are again subject to the aligning forces.

By the side of the abutment 10 a pusher 12 is provided. The same is movably built into a stationary guide 13. By the aid of motor M13, reduction gearing V13 and a crank gear K13 the pusher 12 is moved to and fro in the usual manner, and thereby slips snugly over the belt 6, pushing off at any time the foremost article G of the row contacting the stop 10. The pusher 12 is operated in phase with the machine to be supplied and accordingly feeds the articles to it individually in the correct rhythm for further treatment.

The range within which the belts 1 and 6 can act in unison on the articles is to be so dimensioned that at its end the aligning process is safely terminated. The length required of this range is dependent on the base area of the largest articles, and on the output of the machine to be fed. The speed of the belt 6 should exceed a certain minimum value, which likewise is in the first place a function of the shape of the articles and of the rate of working desired. In order to treat on the same device pieces of different dimensions faultlessly, while saving the same from wear as far as possible, the drive of the belt 6 is constructed with advantage in such a manner that its velocity can be regulated within wide limits. Moreover it has a beneficial effect, when the nonuniform velocity of the belt 1, too, can be regulated within a certain range, that is to say the mean resulting velocity as well as the minimum velocity should be controllable.

The device can be adjusted in a simple way in such a manner that articles of different base area can be treated. For this purpose substantially the lateral abutment 9 only is to be adjusted in accordance with the width of the pieces.

Figure 3:
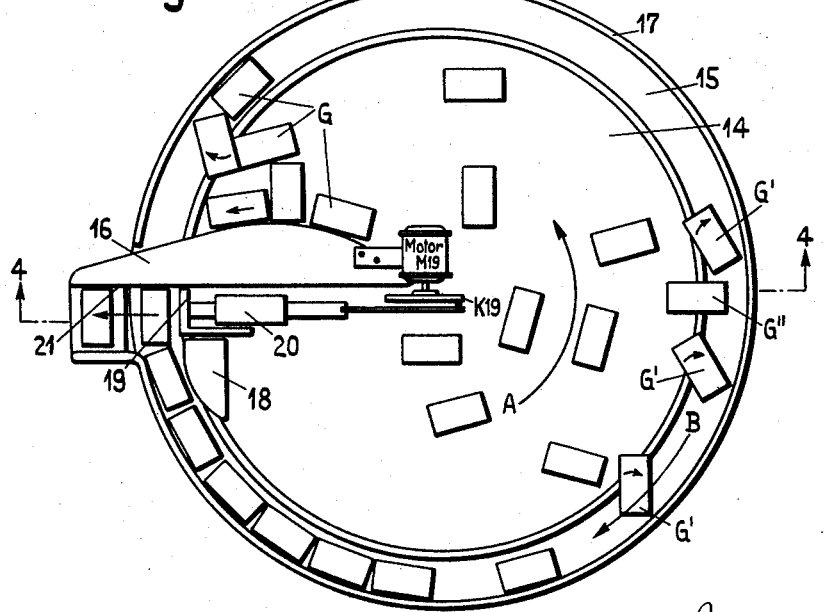
Fig. 3 shows a second embodiment of the device in plan view.

The embodiment of the device according to the invention illustrated in the Figs. 3 and 4 is distinguished from the embodiment described hereinabove substantially in that as the endless transporting members, instead of two belts 1 and 6, a non-uniformly rotating disc 14 and a flat ring 15 arranged and rotating concentrically to the same are provided. Besides, this modification likewise comprises a scraper 16 as well as a lateral abutment 17 which delimits the ring 15 outwardly, and a guide piece 18. Moreover there is again provided a pusher-off device consisting of a pusher member 19 and a guide 20. The pusher member 19 is driven by a motor M19 through a crank gear K19.

The common plane wherein the plate 14 and ring 15 lie, is slightly inclined with respect to the horizontal direction (Fig. 4). The most favourable angle of inclination is dependent on various factors, and is to be adapted to the actual conditions of the case.

The scraper 16, which extends beyond the ring 15, forms with its rear face 21 the abutment for the articles G brought by this ring to the pushing-off position.

The articles G supplied to the disc 14 at random are transported by the same stepwise towards the scraper 16 which deflects the same laterally on to the ring 15. In the transition on to this ring in principle the same conditions apply as on the corresponding point of the device according to Figs. 1 and 2. In a similar way as there, the articles reaching this point are subject to directing forces which align the same firstly to a certain extent on the ring 15. While travelling on the rotating ring 15 the articles G' and G", which have not been faultlessly aligned, are additionaly subjected to the influence of the rotating disc 14. The relative movement between the disc 14 and ring 15 results practically in the same effect as described with reference to the belts 1 and 6, so that eventually articles correctly put into order, aligned in series, are introduced by the ring 15 into the channel formed by the abutment 17 and the guide piece 18. The articles held up at any time by the abutment face 21 of the scraper 16 are then supplied individually by the pusher member 20 to the machine to be fed.

As shown diagrammatically in Fig. 5, the abutment may be constructed with advantage in several pieces arranged eccentrically relative to the flat ring 15 and adjustable with respect to one another as indicated by the double arrow C. Thereby with machines which have to treat articles of different sizes, even under extreme conditions a faultless operation can be attained.

In Fig. 4 the gearing of the plate 14 and of the ring 15 is shown. The shaft 23 journalled in the casing 22 is rotated at constant speed. It may for example be driven with advantage by the motor of the machine to be supplied through the intermediary of a usual type of variator (not shown) in order to allow a stepless regulation of the speed. Parallel to the shaft 23 a second shaft 24 is journalled in the casing 22. At its upper end a flange 25 is keyed on, on which the disc 14 is fixed. On the shaft 24 a sleeve 26, is mounted rotatably. On this sleeve 26, the flat ring 15, a spur gear wheel 27 and a bevel gear wheel 28 are keyed. The shaft 24 carries likewise a bevel gear wheel 29 which is keyed to it. A further bevel gear wheel 30, which is rotatably mounted on a pin 32 fixed to a bracket 31, is in mesh with both the bevel gear wheels 28 and 29. The bracket 31 is mounted freely rotatable about the shaft 24 and about the sleeve 26. It is subject to the action of a forked pull rod 33, which engages on the outer end of the pin 32. An eccentric cam E (Fig. 6) operates the pull rod 33 through a spring loaded lever 133 in such a manner that the bracket 31 is turned to-and-fro about the axis of the shaft 24. A pinion 34 keyed to the shaft 23 is in mesh with the spur gear wheel 27 and transmits the movement thereof to the sleeve 26 and accordingly to the flat ring 15. The latter is consequently set into a uniform rotation. The uniform rotation of the sleeve 26 is transmitted by means of the three bevel gear wheels 28, 29 and 30 in mesh with one another to the shaft 24, and accordingly to the disc 14. By the action of the pull rod 33 a periodical to-and-fro movement is forcibly applied to the bracket 31, and thereby the component fluctuating between positive and negative values is superimposed upon the uniform basic velocity of the shaft 24. The drive operating the pull rod 33 is advantageously so constructed that the amplitude of the oscillatory motion imparted to the bracket 31 can be regulated as required, for example by shifting the eccentric E along the lever 133.

The embodiment according to the Figs. 3 and 4 is superior to that according to the Figs. 1 and 2, particularly in those cases where high output is the essential requirement. On the one hand it can be built more compact under the same conditions, and consequently takes up less space. On the other hand, by the slanting position of ring and plate as well as by the rotational motion thereof further actions of forces (gravity and centrifugal force, respectively) are made use of for the first aligning process. In this connection the pilgim-step motion of one of the transporting members becomes particularly important in that it influences the frictional conditions in a favourable sense (sliding friction) and thereby favours the aligning action of gravity and centrifugal force. The putting into order and aligning of the articles G takes place more quickly. The path required for the corresponding process can be kept shorter.

In both modifications described hereinabove the transporting member taking in the unsorted articles performs a pilgrim-step motion, whereas the other transporting member is moved uniformly. In Fig. 8 a modification is shown in which the first transporting belt 1 is driven by the motor 1 through reduction gearing M11 at uniform speed, while the second transporting member 6 is driven by the motor M6 through gearing V16 at a pilgrim-step motion. In Fig. 9 both transporting members 1 and 6 are driven by their motors M1 and M6 respectively through gearing V1 and V16, respectively, at pilgrim-step motions. The transporting members 1 and 6 could be arranged at a slope transverse of their direction of running as indicated in the modification according to Fig. 7. The action of this measure will however not be felt so strongly there, as in the embodiment according to Fig. 4 since no centrifugal forces enter into the play.

The abutment delimiting the second transporting member as well as the effective face of the scraper may be constructed as endless belts, 109 and 105, respectively, which run over guiding and driving rollers, as diagrammatically shown in Fig. 10.

While I have herein described and illustrated in the accompanying drawings what may be described as typical and particularly favorable embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A device for arranging, aligning and discharging a plurality of articles of any shape supplied at random, comprising in combination a first rotary transporting means, a second rotary transporting means having at least a portion of its article supporting surface in closely spaced relation to said first rotary transporting means, means for driving said first and second rotary transporting means at average velocities differing from each other and with the closely spaced portions thereof moving in opposite directions, article guiding means on said second rotary transporting means for limiting the movement of the articles away from said first rotary transporting means, scraper means extending across said first and second rotary transporting means for deflecting the articles from said first rotary transporting means to said second rotary transporting means whereby when an article is partly on the first rotary transporting means and partly on the second rotary transporting means the centrifugal force and the frictional forces in two opposite directions exerted on the article by the rotary transporting means combine to cause the article to be orderly arranged in engagement with said guiding means on the second rotary transporting means or returned to said first rotary transporting means, and means for removing the articles from said second rotary transporting means.

2. A device as claimed in claim 1, comprising in addition: speed varying gearing operatively connected between at least one of the said transporting means and its associated driving means and imparting a periodically variable velocity to the said transporting means.

3. A device as claimed in claim 1, comprising in addition: speed varying gearing operatively arranged between the said first and second transporting means and its associated driving means and imparting a periodically variable velocity to the said first transporting means.

4. A device as claimed in claim 1, comprising in addition: a circular lateral abutment delimiting the said second transporting means at least in the range of the said scraper means and where the said two transporting means run concentric to one another.

5. A device as claimed in claim 1, wherein the said two rotary transporting means are constructed as a rotary disc and rotary flat ring arranged concentrically to one another.

6. A device as claimed in claim 5, comprising in addition: supply means supplying the articles at random to the said rotary disc.

7. A device as claimed in claim 5, wherein the said abutment face consists of overlapping segments arranged eccentrically of the outer margin, the said flat rotary ring circumferentially adjustable relative to one another whereby the radial distance thereof from the said outer margin is variable.

8. A device as claimed in claim 5, comprising first driving means operating at constant velocity, second driving means operating at periodically variable velocity, the said flat-ring being geared to the said first driving means, and differential gearing coupled to the said rotary disc and to both the said driving means, superimposing the periodically variable velocity of the said second driving means to the constant velocity imparted to the said rotary disc by the said first driving means.

9. A device as claimed in claim 5, comprising speed adjusting means operatively connected to the said rotary disc and speed adjusting means operatively connected to the said flat ring, the said two speed adjusting means being adapted to control the rotational velocity of the said disc and flat ring independently of one another.

References Cited in the file of this patent

UNITED STATES PATENTS

| | | |
|---|---|---|
| 1,212,011 | Brugmann | Jan. 9, 1917 |
| 1,284,637 | Foss | Nov. 12, 1918 |
| 1,430,132 | Wilberts | Sept. 26, 1922 |
| 2,047,106 | Lidberg et al. | July 7, 1936 |
| 2,587,959 | Biner | Mar. 4, 1952 |
| 2,620,059 | Niederer et al. | Dec. 2, 1952 |

FOREIGN PATENTS

| | | |
|---|---|---|
| 869,927 | France | Nov. 27, 1941 |